Figure 12:
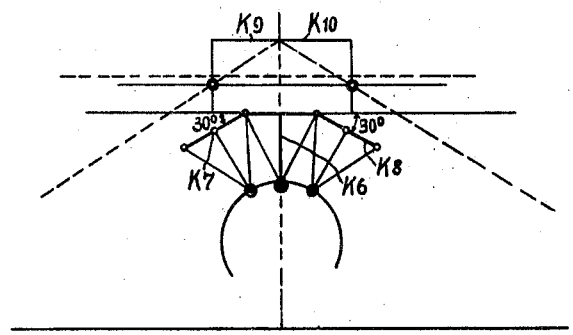

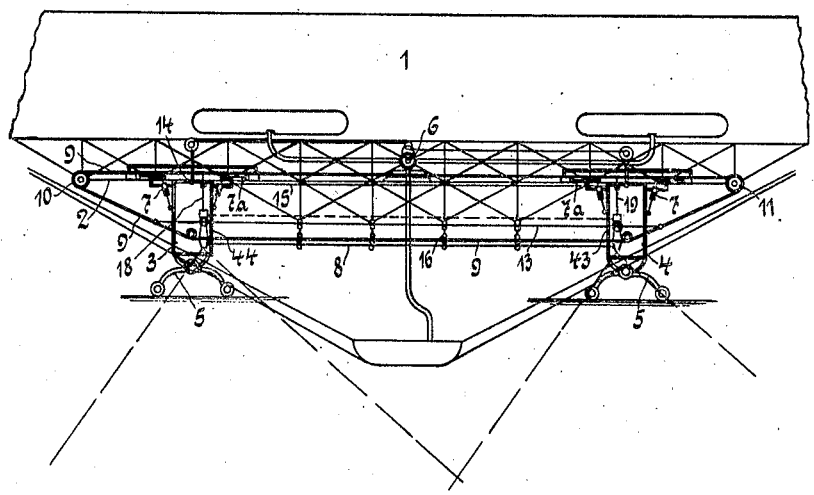

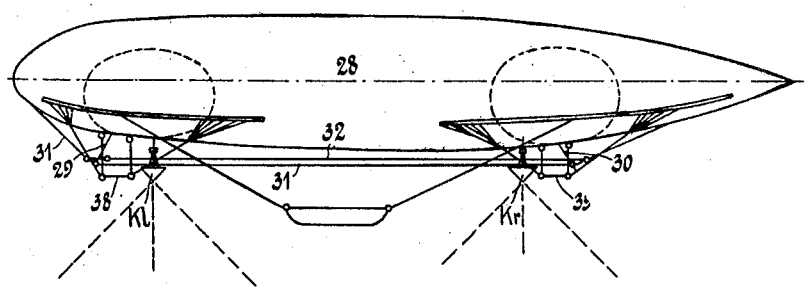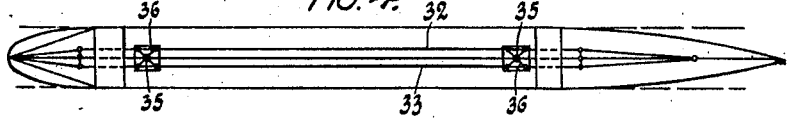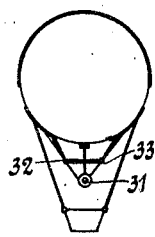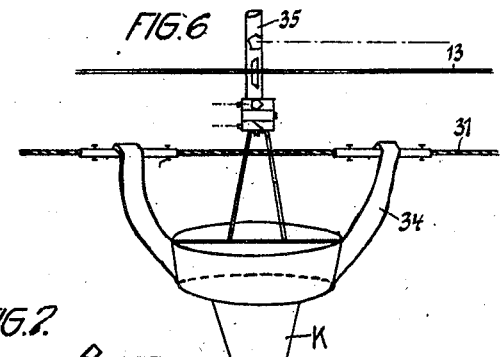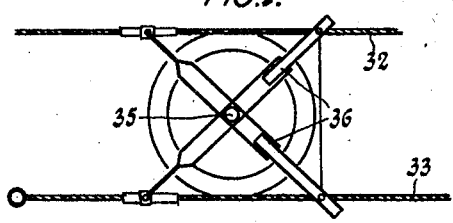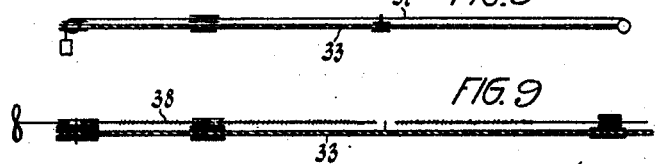

May 18, 1926. 1,585,484
M. GASSER
PROCESS AND APPARATUS FOR THE PRODUCTION OF
AEROGEODETICAL STEREOPHOTOGRAPHS
Filed June 27, 1914 11 Sheets-Sheet 3
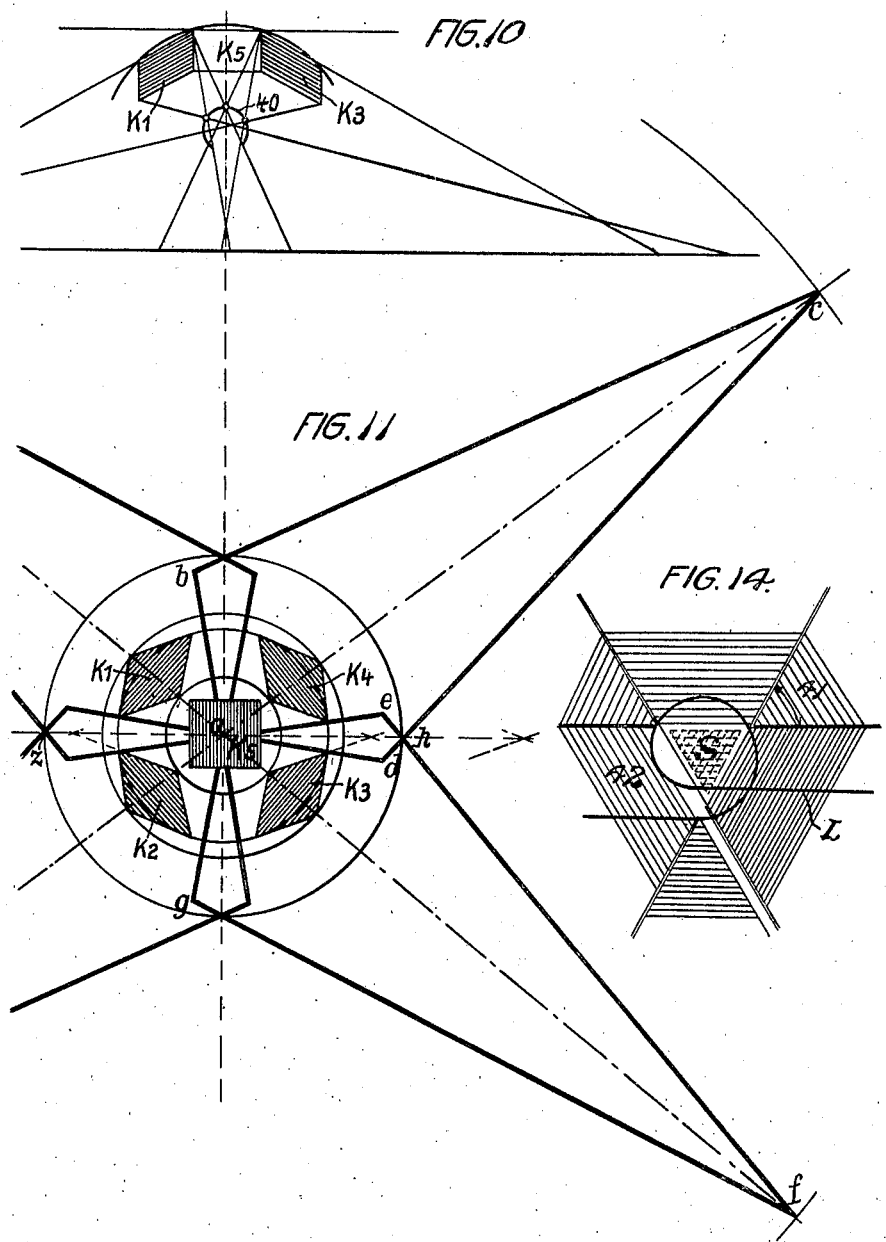
WITNESSES
INVENTOR
MAX GASSER
BY
ATTORNEY May 18, 1926. 1,585,484
M. GASSER
PROCESS AND APPARATUS FOR THE PRODUCTION OF
AEROGEODETICAL STEREOPHOTOGRAPHS
Filed June 27, 1914 11 Sheets-Sheet 4

WITNESSES

INVENTOR
MAX GASSER
BY
ATTORNEY

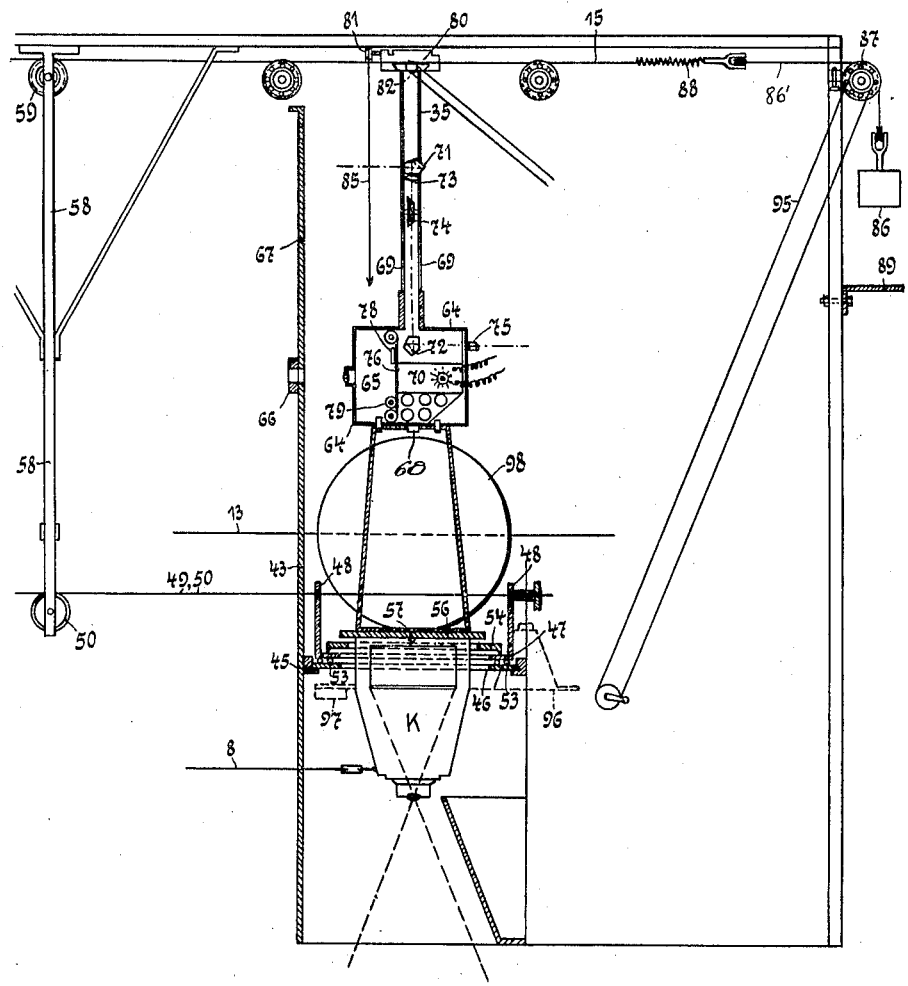

May 18, 1926.
M. GASSER
1,585,484
PROCESS AND APPARATUS FOR THE PRODUCTION OF
AEROGEODETICAL STEREOPHOTOGRAPHS
Filed June 27, 1914    11 Sheets-Sheet 6
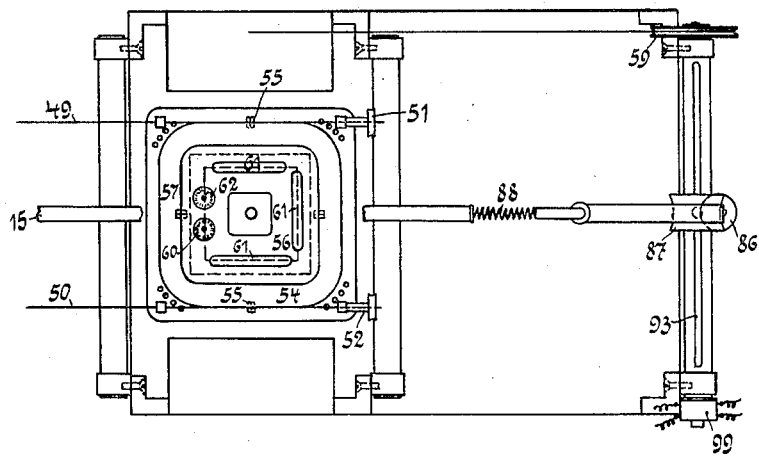
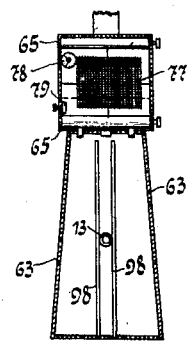
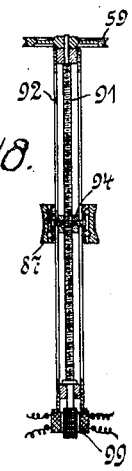
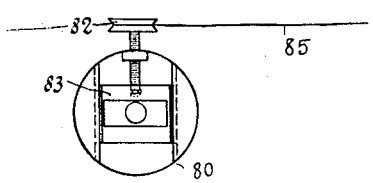
INVENTOR
MAX GASSER
BY
ATTORNEY

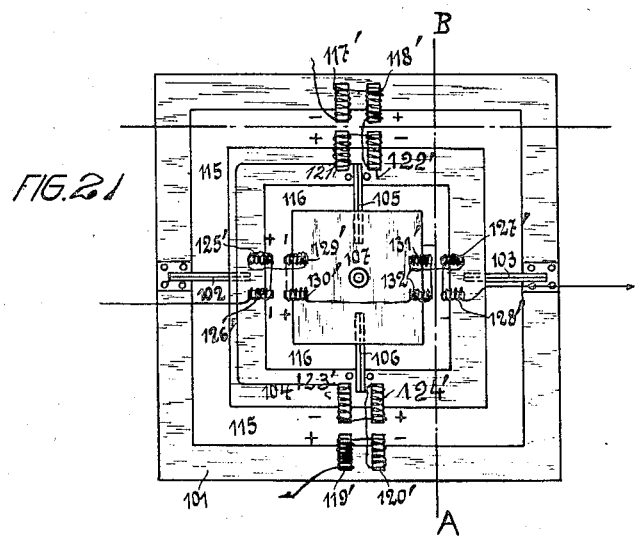

May 18, 1926.  1,585,484
M. GASSER
PROCESS AND APPARATUS FOR THE PRODUCTION OF
AEROGEODETICAL STEREOPHOTOGRAPHS
Filed June 27, 1914    11 Sheets-Sheet 8
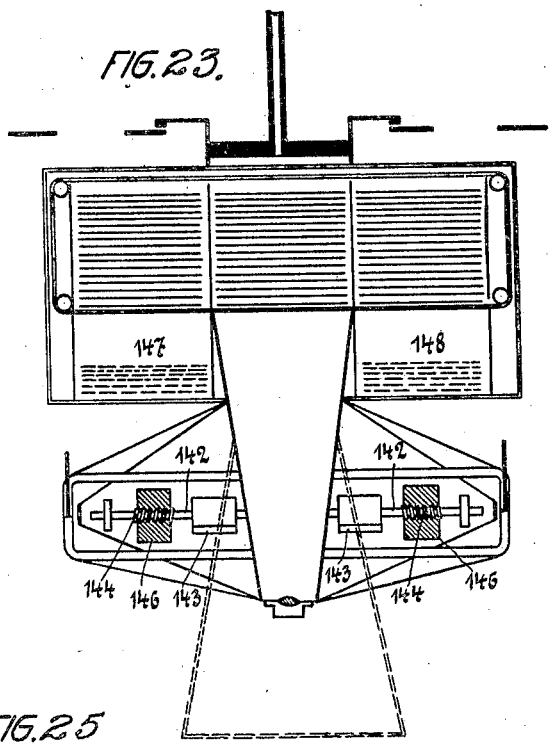
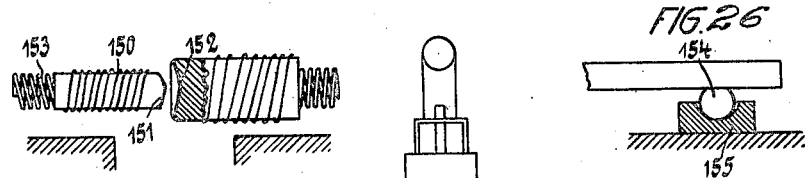
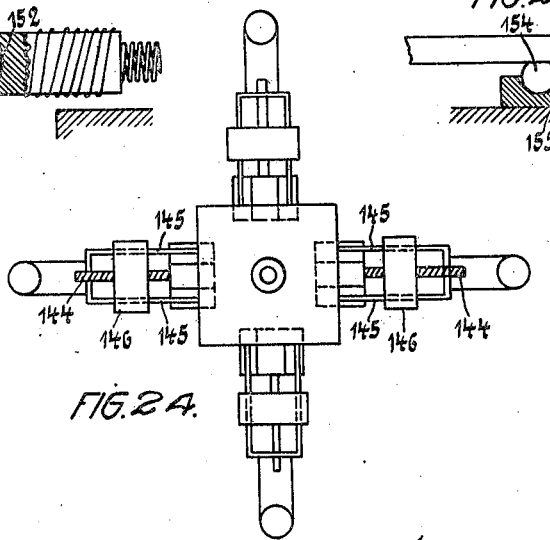
WITNESSES
INVENTOR
MAX GASSER
ATTORNEY May 18, 1926. 1,585,484
M. GASSER
PROCESS AND APPARATUS FOR THE PRODUCTION OF
AEROGEODETICAL STEREOPHOTOGRAPHS
Filed June 27, 1914 11 Sheets-Sheet 9

WITNESSES

INVENTOR
MAX GASSER
BY
ATTORNEY

May 18, 1926.

M. GASSER

PROCESS AND APPARATUS FOR THE PRODUCTION OF
AEROGEODETICAL STEREOPHOTOGRAFHS

Filed June 27, 1914 11 Sheets-Sheet 10

1,585,484

WITNESSES

INVENTOR
MAX GASSER
BY
ATTORNEY

May 18, 1926.

M. GASSER 1,585,484

PROCESS AND APPARATUS FOR THE PRODUCTION OF
AEROGEODETICAL STEREOPHOTOGRAPHS

Filed June 27, 1914     11 Sheets-Sheet 11

WITNESSES

INVENTOR
MAX GASSER
BY
ATTORNEY

Patented May 18, 1926.

UNITED STATES PATENT OFFICE.

1,585,484

MAX GASSER, OF DARMSTADT, GERMANY.

PROCESS AND APPARATUS FOR THE PRODUCTION OF AEROGEODETICAL STEREO-PHOTOGRAPHS.

Application filed June 27, 1914. Serial No. 847,665.

(GRANTED UNDER THE PROVISIONS OF THE ACT OF MARCH 3, 1921, 41 STAT. L., 1313.)

My invention relates to a method and apparatus for obtaining areo-geodetical stereophotographs.

Photographic pictures are made from an airship or from a flying-machine of the district flown over, from which maps and plans may be made for topographical, cadastral and engineering purposes. The invention consists in the employment of two similarly directed single or multiple cameras arranged at a fixed distance from each other and in that further all the objectives are simultaneously opened by automatic means. The invention further consists in that the cameras only then commence to act when the airship or the flying-machine comes into or swings through a horizontal line of flight and finally, in that by means of two recording cameras the readings of all auxiliary apparatus, such as clocks, aneroids, spirit or water levels, surveying staffs, or the like are registered.

Stereo-photogrammetrical measurements from airships must be based upon quite new principles. On account of the above mentioned simultaneous bi-axial photography, stereo-photogrammetry permits of the plates, by means of the stereoscopic effect, being measured in the comparator or in a mechanical protracting instrument. With this process therefore, the relief of the landscape is seen in the comparator. A further advantage of stereo-photogrammetry when compared with the earlier simple balloon-photography and its methods of estimation consists in that each photograph from each plate holder can be automatically estimated or valued in conjunction with the other plate holder in the protracting instrument.

A further advantage is that no mathematical calculation is necessary and no rephotographing for estimating purposes, but the perspective of the photograph is converted by automatic means into the right angled co-ordinates of a topographical map of a kind now commonly employed, simply by bringing the comparator marks into coincidence with the similar (identical) picture points.

When compared with that which is known upon the subject, the bi-axial stereo-photogrammetrical aero-photography is to be regarded as the purpose of the whole device and its employment for the purpose of making maps is likewise new.

The object of the invention is to obtain by means of the co-action of the technical detail, a synchronous bi-axial aero-photograph which approaches as nearly as possible to the stereo-photogrammetrical normal case. The axis of the airship must consequently be horizontal at the moment of exposure, and the two camera axes must be vertical and adjusted with relation to each other in order to give the stereo-photogrammetrical normal case. Although the protracting apparatus permits of estimating and converting photographs to maps, with inclined axes, the object is especially to obtain a normal case by the co-action of the manual and electro-mechanical devices. These devices comprise tensioning devices for the base, photographic apparatus with corresponding suspension devices, stabilizing and adjusting mechanism and finally, special devices for causing the simultaneous release of the operating parts.

On the accompanying drawings devices are illustrated by way of example for carrying out the process for obtaining aero-geodetical stereophotographs.

Figs. 1 and 2 are side and bottom views respectively of a base tensioning device for keel ships, which is automatically tautened by the weight of the observation cabins, Figs. 3 and 4 are views of base tensioning mechanism for non-rigid ships, Fig. 5 is an end view, and Figs. 6-9 are details.

Figure 13:
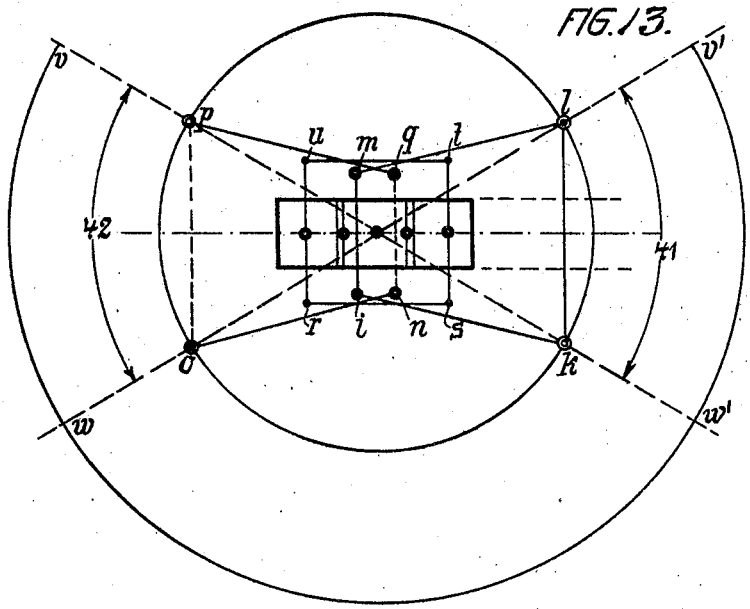
Figure 27:
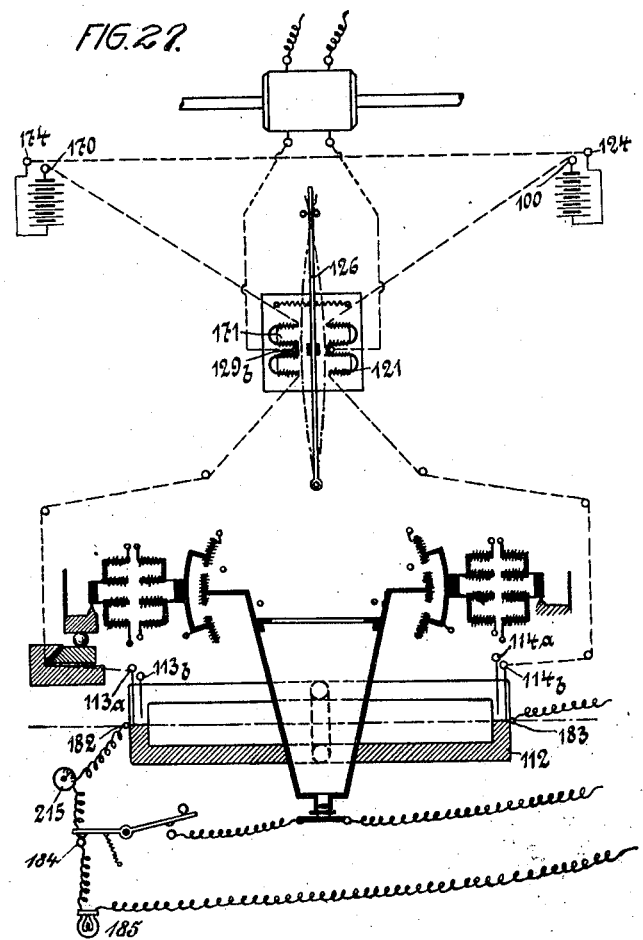
Figure 28:
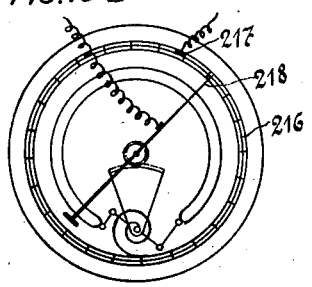
Figure 29:
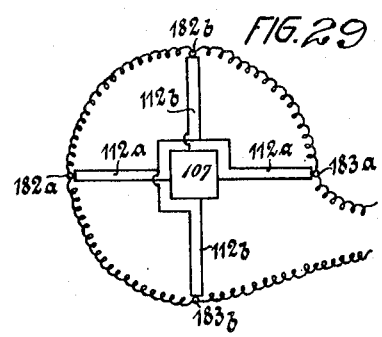
Figure 30:
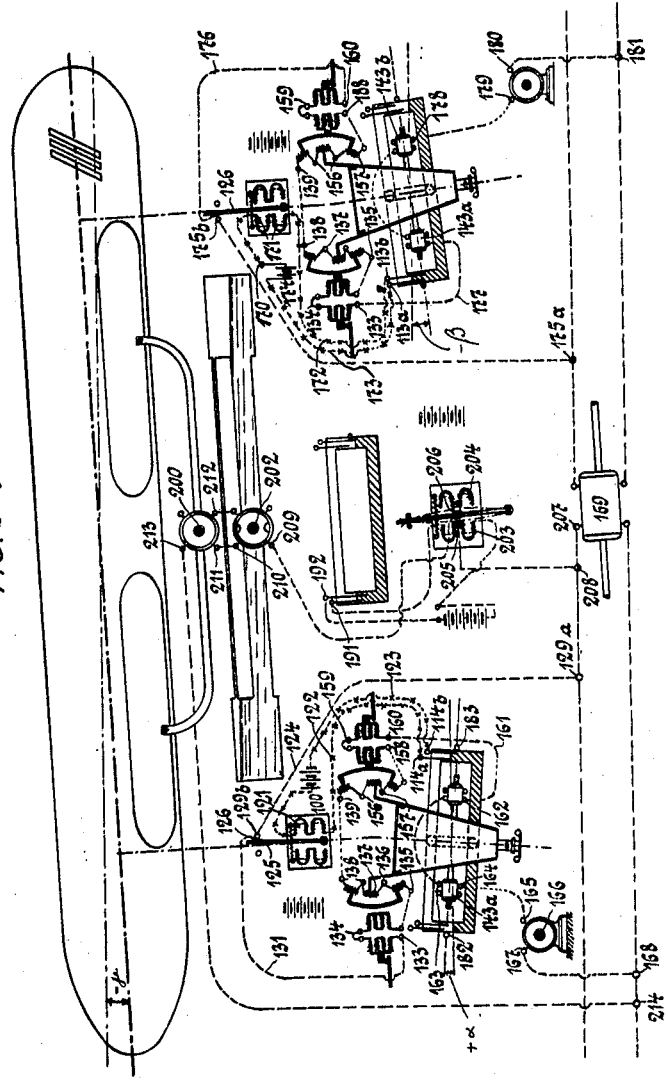

Figs. 10 and 11 are a side view and plan respectively of a five-fold panorama camera with visual field, Figs. 12 and 13 show a five-fold sector camera with visual field in side view and plan respectively, Fig. 14 is a diagram of the country to be photographed taken by turning the airship, Fig. 15 is a section through the camera and appertaining devices with stabilizing and adjusting mechanism (mechanical adjustment), Fig. 16 is a plan of the arrangement shown in Fig. 15, Fig. 17 is a vertical section through the arrangement shown in Fig. 15, Fig. 18 shows the shaft for the directing mechanism (manual and electrical) with band guiding, Figs. 19 and 20 show details for adjusting the upper end of the sighting spindle, Fig. 21 is the plan of a Cardan suspension for the camera (electro-mechanical stabilizing and automatic adjustment), Fig. 22 is a section on the line A—B of Fig. 22, Figs. 23 and 24 are section and plan respectively of a camera mechanism engaging with a vertical spindle and provided with weight compensating devices, Fig. 25 shows a snapping-in mechanism of oppositely disposed magnets, the electromagnets being shown to a larger scale, Fig. 26 illustrates a Cardan arm mounted on a ball (instead of knife-edges), Fig. 27 is a section and diagrammatical view through a releasing mechanism during the horizontal position of the airship axis and vertical position of the camera axes, one pin on each side (left and right) being in the mercury, Fig. 28 illustrates a barometer, Fig. 29 shows the contacts, Fig. 30 is a diagrammatical view of the current circuit with inclined airship axis $(-\gamma)$, inclination of the left-hand camera $+ \alpha$ to the west and inclination of the right-hand camera $\beta$ to the east, Fig. 31 is a diagrammatical view of the circuits at the moment of exposure, According to the arrangement shown in Figs. 1 and 2 there is secured to the rigid or unrigid hull 1 a keel in the form of a girder support 2. The cabins 3 and 4 may be secured either direct to the keel 2 and provided with any known device especially suitable for landing purposes. The cabins may be arranged to be drawn in. This is effected by means of a winding mechanism 6 which may be driven from the gondola by a motor. In order to guard the observation cabins 3 and 4 from shocks, buffers 7 are provided—similar to those used with doorclosers—which may engage with their pistons in two cylinders 7ª arranged on the keel frame, which are inter-connected by means of air cocks and piping and operated positively by compressed air.

The weight of the cabins is employed indirectly for tautening the base 8. For this purpose endless wire ropes 9 are guided round the rollers 10, 11 and secured to the cabins 3 and 4. The wire ropes 9 are connected with each other by cross-stays 12 to which is secured a rope 13 which passes through the camera K in the Cardan suspension. The base 8 itself consists of an invar band which is protected from bending as far as possible by adjustable suspension rollers 16. The base can be altered by means of any suitable device. In order to better distribute the moments of force, two large transverse tension members 17 may be provided.

The mechanical parallel position of the optical axes of tubes 18, 19 is obtained by a mechanical parallelogram formed by a further band 15 arranged along the keel parallel to the invar base band 8, secured to the suspension point 14 of the left-hand cabin 3 and terminating on the right-hand cabin after having passed over a roller. Into this band 15 are inserted the ends of the tubes 18, 19 which lie in the optical axes and which contain the optical sighting devices. These vertical tubes 18, 19 may be adjusted in the vertical position mechanically and in the direction of the base length. To insure the vertical position of the vehicle a number of Renard damping surfaces or rudders are to be employed, but these questions are of aerotechnical and not of surveying-technical nature. The vertical plane in which the photographic apparatus hang is determined by the wire ropes 9 and 13 which carry the whole weight of the cabin and by means of the band 15.

For ships which are held taut by gas pressure, i. e. by ballonettes, a flexible band is used as illustrated by way of example in Figs. 3–5. To the hull 28 are secured two inclined struts 29, 30 which are suitably tensioned similar to the wings of a flying-machine. From the front end of the hull a wire-rope 31 passes over the left-hand strut 29, then about 70 metres along the body of the airship, over the right-hand strut 30 and again terminates on the hull. This wire-rope may be brought up to any high tension desired. The gas pressure will support 200 kgs. with ease. Arranged somewhat above this main rope are provided 2 subsidiary ropes 32, 33 so that these three ropes form the edges of a prism.

The cameras K¹ and Kʳ are inserted in the holding device 34 for the Cardan suspension on the main rope 31. It is preferable to construct the cameras in this case of aluminum. The cameras are adjusted in the present case (Figs. 7, 8, 9) by the extended vertical bars 35 by the intermediary of the scissors-like device 36. By means of this said device, the vertical guiding bars 35 may be brought into the desired position, by pulling a band 37 or turning a screw 38 attached to the guide-ropes 32, 33.

Two cameras are employed which are exposed simultaneously and which are held at a determined distance from each other by means of the base tensioning device 9. In the drawing the simplest case is illustrated, viz, one single camera which, however, on account of the restricted visual field does not give sufficient surface of country.

This disadvantage is overcome by combining several cameras arranged at an inclination to each other into a single photographic apparatus, Figs. 10—13. In order to obtain as large a visual angle as possible, focal distances of 6 or 9 centimetres were employed with the earlier constructions, but it was found that these focal distances, at heights of from 300-500 metres do not give a picture sufficient in detail to be measured under the comparator microscope. A further disadvantage of these known constructions lies in the large angle of inclination of the side-cameras to the horizontal. At 45° or even 60° inclination the view in an occupied country is lost, so that photographs for measuring purposes for the preparation of topographical maps is of little value. It has been shown in connection with stereo-photogrammetrical railway surveys that the depth effect and clearness of the picture is a function of the focal distance, i. e. between the focal distance of an objective and the remoteness of a point from which a distance appears measurable by means of the stereoscopic measuring principle, there exists a certain optical relation. As however, the clearness of the picture for measuring purposes should be the main feature of the photograph on account of the accuracy of the map to be prepared, then only cameras which have a greater focal distance than 20 centimetres can be employed at heights of from 800-1000 metres. In order now to obviate these disadvantages of the constructions hitherto employed, panorama and sector cameras of a new construction are necessary. The focal distance which is two or even three times longer than those hitherto employed necessitates the rejection of the simple sectors (crown cameras) and the adoption of a facet construction similar to the eye of a fly. Figs. 10 and 11 illustrate a multiple-camera of this type. The individual cameras $K^1$, $K^2$, $K^3$ and $K^4$ have the permissible inclination of 30° both in the $x$ and the $y$ direction. The objectives are arranged not as in the old construction, but upon a spherical surface 40. The four cameras are built perfectly symmetrical and are arranged symmetrically around the centre camera $K^5$. The optical axis of this centre camera is vertical and the plate consequently horizontal.

The inclined cameras are arranged diagonally, so that the camera $K^2$ for example, covers the visual field $a, b, c, d$, whilst the adjacent camera $K^1$ covers the surface $a, e, f, g$. The surfaces overlap by the common area $a, d, h, e$ (Figs. 10 and 11). The four surfaces which project beyond the circle $b, h, g, z$ serve for adjusting the adjacent photographs. Seven-fold and nine-fold panorama cameras may be constructed in the same manner.

If these nine-fold, seven-fold or five-fold cameras are especially suitable for topographical panorama photographs, a five-fold sector camera may still more advantageously be employed, which on the rotation of the airship makes several photographs successively over the same spot thus giving a panorama. This sector camera is employed more especially for airships with reversable propellers and is very suitable for "all round" panoramas and military reconnaissances beyond cannon range, as the horizontal view of the cameras $K^9$ and $K^{10}$ in their visual field is only restricted by the limit of visibility.

The sector cameras likewise consist of five cameras which, however, all have their objectives in the plane of the paper. The lower three cameras whose total visual field is indicated by $o, p, l, k$ serve, on the forward movement of the airship to photograph successively sections of the country perpendicular to the longitudinal axis of the ship. As the side cameras $K^7$, $K^8$ are inclined at 30° to the horizontal, then on the forward movement of the airship quadri-angular sections of country are taken which lie perpendicular to the axis of the airship. If it is desired to work at visual distances exceeding 5 kilometres, especially for maps of small scale, then the centre camera $K^6$ (Fig. 12) is employed in combination with the two horizontal cameras alone, whereby a stretch of country of 70° picture angle is obtained, indicated by the surfaces $v, u, t, v', w', s, r, w$. By turning the air ship three times according to the compass (−10° error permissible) the whole periphery is obtained enclosing an "all round" panorama of about 10 kilometres diameter.

In order to adjust the three photographs with relation to each other, the centre camera is employed which shows the centre surface S three times. This repetition of the nadir district serves for adjusting, for eliminating centering error and for combining the panorama sections by means of the optical coincidence of the picture points.

Increasing the visual angle from 70° to 110° does not diminish the accuracy of the measurability of the pictures or plates under the stereo-comparator as the focal distance is greater than 20 centimetres.

The cameras are arranged within the cabins (Fig. 15). On the cabin walls 43, 44 facing each other (Fig. 1) is arranged the fixed seating 45 (Fig. 15) for the plate 46 which carries the cameras by the intermediary of a circular member 47. The plate 46 slides in the swallow-tail slide of said circular member in the direction of the base. This plate 46 is provided with an opening which permits of the free movability of further devices which are provided with Cardan suspension. On the plate 46 lies the circular member 47 which carries two vertical directing bars 48. These latter, in consequence of the adjusting wires 49, 50 and screws 51 and 52 (Fig. 16), assume the positive parallel position of the Y axes of the two plates. In order to more easily obtain the parallel position, the circular member 47 rests upon a ball-bearing crown 53. The outer Cardan ring 54 rests upon the circular member 47 on knife-edges 55. Upon the Cardan ring 54 lies the uppermost covering plate 56 which supports the camera below and the remaining instruments above. The plate 56 oscillates on the knife edges 57. The wires 49, 50 are also of invar, this alloy being the least sensitive to temperature differences. Supporting irons 58 with rollers 59 prevent this wire from sagging.

On the plate 56 are provided a clock 60 (Fig. 16), aperiodic spirit levels 61 arranged U-shape, and an aneroid 62. The clock serves not only for the chronological order of the plate holder numbers, but also for the later astronomical determination of pole height and azimuth of each individual plate, because the position of the clock-hands is also photographed. This clock corresponds to that in the recording camera.

On the plate 56 is arranged a frame 63 for the recording camera 64. In the frame 63 are provided two round directing discs 98 for the purpose of guiding the two cameras parallel in the direction of the longitudinal axis of the airship. Between said discs 98 is guided the main rope 13 which, on account of its high tension, sharply determines the direction. The recording camera 64 contains in its front portion a camera 65 which photographs the position of the oppositely disposed staffs 66, 67 (Fig. 15) arranged perpendicularly to each other, with leveling graduations, at the moment of exposure.

In the lower part of said recording camera 64 is arranged a finder 68 which throws on to the observation table 56 the position of the auxiliary instruments, such as levels, clocks, and numbers. The camera 64 also contains an incandescent lamp 70 which flashes on the horizontal position of the ship axis and indicates the moment of exposure.

Into the upper part of the camera 64 is inserted the lower end of the telescope 69 contained in the guide spindle 35. The telescope is twice interrupted and contains between the penta prisms 71, 72 and in front of the objective 73 a prism 74 which can be rotated to a certain extent and which therefore makes the picture vertical. Through the ocular 75 the observer regards the sighting marks and staffs 66, 67 provided on the other camera in order to be able to judge the mutual position of the optical axes.

In Fig. 17 is illustrated the rear wall of the camera 65, in which immediately in front of the film 76 is provided a grid 77 which on exposure is projected on the film and contains half millimetre graduations. There is also provided a clock 78 which agrees with the clock 60. The clock 78 is provided with a face of glass and extended hands, and a known numbering device 79 is also provided. By means of this recording camera the mutual position of the optical axes of the photographing cameras is ascertained and simultaneously the difference in height of the photographing cameras. By this means all mathematical data for the position of the two momentary axes of the two cameras K at the moment of exposure with relation to each other may be ascertained. The vertical spindle 35 extends above the telescope into the parallel guiding band 15, on which is provided the swallow-tail adjusting device 80 (Figs. 19, 20). By means of the rollers 81, 82 the slides 83, 84 may be adjusted vertically above each other or forwards and backwards. This displacement is effected from the observation station by means of the cord 85 guided over the roller.

The invar band is tensioned by means of a weight 86 whose suspending wire 86' (Fig. 15) is guided over the roller 87. A dynamometer 88 is inserted at the end of the invar band in order to facilitate the displacement within certain limits and without shocks, and a plate 89 is secured to the cabin wall to catch the weights 86.

The wire 86' is guided over the roller 87 which can likewise be rotated. The axis 91 of this roller is formed as a screw and contained in a tube 92. Into the two slots 93 project pins 94 which on the rotation of the screw 91 move the roller 87 backwards and forwards. By this means the band and indirectly the cameras are brought into the vertical plane of the suspension piston.

The rotation may be effected by means of a cord 95, and by this means the adjustment of the two cameras is rendered possible manually.

In order when making photographs to be able to supervise and control the contact or interconnection of the country being surveyed, an inclinometer 96 is provided which is counterbalanced by the counter-weight 97.

When making topographical photographs it is not absolutely necessary that the airship axis be horizontal, because the appertaining protracting apparatus renders possible the estimation of photographs taken from unequal heights, but the horizontal position of the airship is desirable for the stereo-photogrammetrical normal case which considerably simplifies the measurement of a place. The airship axis can be brought to a horizontal position with sufficient accuracy by carefully operating the steering members by hand.

In order, however, to make the observer at the cameras independent of the art of navigation, an automatic attainment of the horizontal position is rendered possible by electro-mechanical means.

In further prosecuting this idea, the vertical position of the optical axis of the two cameras is striven after, so that by means of the co-action of the two stabilizing mechanisms of the air ship axes and of the cameras the normal case in obtained and at this moment the shutters of the cameras are simultaneously released.

With the above described Cardan suspension the rings can swing freely through the horizontal position. In order to assure and at the same time to damp these oscillations, a device is provided which arrests the Cardan joint at the moment of the passage through the horizontal, thus acting as a stabilizer upon the oscillation. As shown in Fig. 22 electromagnets are arranged on the Cardan frames pairwise on the outer and inner frame plates or rings and at such a position with relation to each other that opposite poles face each other. The direction of flow of current changes according to the inclination and these electromagnets consequently repulse or attract each other.

Fig. 22 shows a section through A—B of Fig. 21. On the actual Cardan ring 101 there is supported by means of the knife edges 102, 103 the inner Cardan frame 104, upon which the plate 107 which carries the camera is supported by the knife edges 105, 106. These knife edges are arranged as with astronomical pendulating apparatus, but can also take the form of balls 154 resting in a socket 155 (Fig. 26). Metal arcs 108 are arranged on the Cardan frame 101 (Fig. 22) in the plane of the knife edges 105, 106. These arcs carry the electromagnets 109, 110. In the inner Cardan member 104 are connected the electromagnets 111 and these electromagnets in conjunction with magnets 109, 110 effect the quicker adjustment during oscillations of the airship.

The electric currents are switched in and out by a suitable device provided on the camera, consisting of inter-communicating tubes 112 filled with mercury, into which said tubes, at their upper ends, there project adjustable pairs of contact pins 113 $a$ 113 $b$, and 114 $a$ 114 $b$.

In order to render the movement of the mercury surface suitable for these contact purposes, the tubes are arranged as communicating tubes closed at all ends, and consists preferably of wood. The upper ends of said tubes are filled with non-conducting petroleum so that the points of contact are exactly determined and the movement of the pillar of liquid which in spite of the weight of the cameras can occur may be braked or throttled, as desired. The arrangement shown in Fig. 22 must of course be repeated in the plane perpendicular to that illustrated, viz, in the plane of the knife edges 102, 103.

If now the contacts $113^a$ and $113^b$, $114^a$ and $114^b$ are adjusted at different heights, then the centre member of the Cardan joint will assume a previously determined inclined position.

In order to arrest the Cardan rings in the plane of the outer ring 101, further electromagnets are provided which are best seen in Fig. 21. These are the electromagnets which are attached to the individual Cardan frames and to the centre member and project into the free spaces 115, 116 and in consequence of their different windings oppose each other with opposite poles. In the modification illustrated the electromagnets $117'$, $118'$, $119'$, $120'$ are secured to the ring 101, and opposite to them are the magnets on the frame 104, viz, $121'$, $122'$, $123'$, $124'$. The electromagnets $125^1$, $126^1$, $127^1$, $128^1$ on the same frame 104 serve for the vertical plane of oscillation, and the electromagnets $129^1$, $130^1$, $131^1$, $132^1$ secured on the centre member 107 are arranged alternately to the magnets on the frame 104, viz, $125^1$, $126^1$, $127^1$, $128^1$.

The electromagnets $117^1$, $118^1$, $119^1$, $120^1$ may be so constructed that they attract movable iron cores 150 on the flow of current which then engage with paraboloid surfaces 151, 152 and, on the interruption of current are withdrawn under the action of springs 153.

The current is switched in so that on the oscillation of the parts 104 and 107 through the plane of the ring 101, the poles of the electromagnets, which at this moment lie opposite to each other, become oppositely magnetized and consequently mutually attract each other. The current is switched in by the dipping-in of the contacts $113^a$, $113^b$, $114^a$, $114^b$.

The device above described takes effect upon the position on the passage of the Cardan plate through the horizontal or, according to the adjustment until a certain desired angle of elongation is obtained. For adjusting purposes, especially for the exact adjustment of the vertical axis, the spindle 35 extending from the camera K comes into engagement with the cross slide 83 or 84.

As will be seen from Figs. 18, 19, 20, these adjusting spindles pass with their upper ends into a cross slide (Figs. 19 and 20) whose screw spindles 81 and 82 are rotated by means of an auxiliary motor 166 which may be situated in the cabin, by means of a cord or chain transmission 85. The chain transmission passes over pulleys provided on an axle operated from this motor and is thrown into gear at the moment of the passage of the current by electromechanical devices for forward and reverse running. This device can be arranged on the transverse shaft 91 (Fig. 18) so that the directing band 13 is moved to and fro in the Y-direction. This mechanism or its shaft 91 can likewise be driven from an auxiliary motor in the cabin by the intermediary of cord or chain transmission.

The arrangement may, however, be such (Fig. 18) that a small motor 99 is attached direct to the axle. The fixed magnet cores of same are secured to the outer tube so that on rotation the spindle axis rotates and consequently controls the support for the directing band in the vertical direction.

When employing a Cardan suspension of the type described in airships or flying machines, it is also of importance to counteract movements of weights at any moment. A device especially suitable for this is shown in Figs. 23 and 24.

The shafts 142 which lie in the horizontal plane and extend in the $x$ and $y$ direction are driven by small motors 143. On the rotation of the shaft 142 which is threaded at 144, the weights 146 provided thereon and prevented from rotating by guide bars 145 are moved along the threaded spindles. As soon now as any alteration in weight occurs in the Cardan suspension, for instance, if the one plate magazine 147 (Fig. 23) contains more plates than the other magazine 148, then current is switched on to the motor 143 in the manner already employed. The weights 146 in Figs. 23 and 24 must consequently move to the right or to the left. In the same way the other weights 146 arranged perpendicular thereto will come into action as soon as necessary.

In order now to produce the normal position in an airship for aero-geodetical photographs, devices are provided by means of which a simultaneous electrical operation of two photographic apparatus arranged about 70 metres apart is effected with simultaneous automatic adjustment of the airship axis into the horizontal and of the two optical axes into the vertical.

In order to explain the passage of the current, the circuits (and only those in question) are illustrated with deflection to the west (or north) and with inclination to the east (or south).

The current circuits, for the automatic coaction must be quadrupled with both cameras (for east, west, south and north inclination, Fig. 29.) In practice a number of the wires may be used twice as with opposite deflection the current only reverses its direction along the same path.

The following is the circuit in the left-hand apparatus with the inclination ($+ \alpha$) against the horizontal: In this case (Fig 30) the right-hand pair of contacts 114$^a$ 114$^b$, dips into the mercury and closes the circuit.

The relay circuit and working-circuit must be distinguished from each other:

The relay current takes the following path (Fig. 30):—

From the terminal 100 of a constant battery, the current flows to the electromagnets 121 of the relay, along the wire 122 through the contact 114$^a$ into the mercury, thence through the contact 114$^b$ along 123 to the negative pole 124 of the battery.

This current excites the electromagnets of the relay 121 which draws the hammer 125 to the right, whereby the circuit leading from the generator 169 is closed at the contacts 126 and 129$^b$. This service current passes along the wiring 131 into the electromagnets of the outer Cardan ring through the terminal 133, and passes through the wiring 135, 136 into the inner ring 137 of the suspended camera. The current passes over the wiring 138, 139 along the same path over the rings through the wiring 156, 157, 158, 159, 160. The electromagnets in the Cardan frame are consequently excited and attract or repulse each other according to the winding, so that the rings and the camera strive towards the horizontal. This is rendered easier by the fact that the working current passes along the path 161, 162, 163 into the weights 146 which rotate and are moved by electric means, so that said current is guided over 164 and through contact 165 into the electromotor 166 which brings the camera into the vertical position, whereupon the current flows back through the wiring 167 to the parallel wiring 168 into the generator 169.

With the position according to the right-hand side, in which the left-hand pair of contacts 113$^a$ 113$^b$, are in the mercury, the relay current commences from the pole 170, excites the electro-magnet 171, comes over 172 into the contact 113$^a$, through the mercury and the contact 113$^b$, over the wiring 173 back to the battery terminal 174.

The service current is closed at 175$^b$ by the hammer 126 swinging to the left. The service current flows through wiring 175$^a$ 175$^b$, 176, over 160, 159, 157, 156, 139, 138, 137, 135, 134, 133 thus flowing along a path exactly opposite from that described above, then along 177 into the motors 143$^a$ and 143$^b$ and emerges at 178. The weights 146$^a$, 146$^b$, are thus moved in the opposite direction from the left-hand position. The current flows over 179 to the machine 166, rotates this in the opposite direction from that on the left-hand side and completes the circuit over 180 through the parallel terminal 181 into the generator 169.

In these two positions the cameras are inclined. Both circuits are available in the east-west direction and perpendicular thereto in the north-south direction.

These circuits differ in no way from those of the left-hand and right-hand positions, as they are perfectly symmetrical and fulfil the same purpose in the north-south direction.

Other conditions occur when the mercury surface oscillates through the horizontal and comes in contact with the fixed contacts 182, 183, as shown in Figs. 27, 29, 31. In this moment the current is caused to flow and in the relay the contact carrier 126 is attracted equally by both electromagnets 121, 171 and the service current is consequently cut out. In order to better retain the neutral position, the hammer is constructed as a piece of a flexible band 126 which bends on attraction (Fig. 27) and on the interruption of the current immediately swings back in consequence of its elasticity. The relay current which passes from the batteries to the terminal 100, through 121 and the contacts 114$^b$ and 113$^a$ which dip into the mercury in the horizontal position, over 174 into the other battery 170, 174 is closed by the wiring 174—124 (Fig. 27). At this moment, however, the relay current which is fed from a small accumulator battery or by the cells 191, 194, flows also through the contact wiring 182, 184, through the incandescent lamp 185 and returns through 183. The lamp 185 now flashes up and at this moment the key 186 may be depressed and the instantaneous shutter 187 is released, whereby the current returns over 188 to 183. This circuit must also be guided through the horizontal contacts 182$^b$ 183$^b$ perpendicular to the plane of the paper (Fig. 29).

Fig. 31 shows the whole path of this relay current for the camera release on the horizontal position of the two camera levels.

The course of the relay current is likewise illustrated with the horizontal position of the airship axis (from 183–189), the service current being likewise omitted (this condition that the release of the two instantaneous shutters 187 and 190 only takes place during the simultaneous horizontal position of the airship axis, may be avoided by the direct connection of the contacts 183 with 195 over 191, 192, 193, 194).

The relay current flows from 183 towards 191—192, 196—197, 193—194, 195—189.

At 198 is a further branch and a second key in order to lead the current back partly over 199, 185 and 182 to 183 without releasing the instantaneous shutters and only illuminating the two lamps 185, 199. On the depression of the keys 186 or 198, the current flows through the electromagnets of the two instantaneous shutters 187 and 190 and closes both simultaneously, at the same time cutting out the two incandescent lamps.

In order now to obtain for the photographs the permissible deviation from the horizontal position within practical permissible limits of error, or in order not to exceed same, the contact heads 182, 183, 196, 197, 195 and 189 may have the permissible diameter, or the contacts 114$^a$ and 114$^b$, 113$^a$ and 113$^b$ are adjusted to the permissible angle of inclination, so that the instantaneous shutters are released within the limit of error allowed.

The relay carrier shown in Fig. 31, which can also consist of a steel band movable from both ends (Fig. 27) and bends on attraction, for the service current which feeds the fan 200 and the rotary pump 202 is held in the central position by the simultaneous attraction of the electromagnets 203, 204 similar to Fig. 29.

As already stated, the two instantaneous shutters may be released independent of the position of the airship axis by directly connecting 183 to 195.

In Fig. 30 the left-hand camera is inclined $+\alpha°$ (to the west) and the right-hand camera $-\beta°$ (to the east). The airship longitudinal axis has an inclination of $-\gamma°$ downwards.

The action of the independently operating relay currents and service currents will now immediately begin in order to produce automatically the horizontal position shown in Fig. 31.

By the inclination to the west, the contacts 114$^a$ and 114$^b$ (Fig. 30) dip into the mercury surface and close the relay current 100, 121, 114$^a$, 114$^b$—124. The iron core 121 becomes magnetized, attracts the hammer 126 which closes the current at 126, 129$^b$. This current flows over 131, 133, into the Cardan magnets 134, 137, then over 138 into the Cardan magnets 139, 159 over 160—161 into the balancing devices 143$^a$, then over 165 to the horizontal-adjusting dynamo 166 and over 167 through the parallel circuit 168 to the generator 169 and over 129$^a$ to the point of completion 129$^b$.

These two currents will continue until the vertical position is obtained independent of the position of the airship axis and of the other camera.

The right-hand camera will simultaneously strive to assume the vertical position. The current path is in this case reversed, but symmetrical. The relay current commences from 174, is closed by the contacts 113$^a$, 113$^b$ dipping into the mercury, excites the magnets 171 and returns to the battery at 170. The service current is closed at 175$^b$ by the movement of the hammer 126. This service current flows through the Cardan magnets 159, over 138 to 134 and through the balancing devices 143$^a$ and 143$^b$ which now rotate in the opposite direction, then through the pole terminals 179, through the motor 166 for effecting the horizontal adjustment at 180 and passes over 181 to the generator 169, then over 175$^a$ to the point of completion 173$^b$.

The same current circuit may likewise be employed for producing the horizontal position of the airship. As the ship is inclined downwards by $-\gamma°$, then the contact pins 191, 192 dip into the mercury, excite the electromagents 203 which close the service current at 205, 206. From the generator terminal 207 the current now flows over 208 to the finishing point 205, 206 towards 209 and here causes the rotation of a rotary pump 202. With this position of trim, the pump will force the water towards the raised side. The service current passes from the terminal 210 through 211 and rotates a fan 200 which forces the air to the same side to which the rotary pump forces the water or to the opposite side, as desired. This is effected in order to damp the oscillations caused by the displacement of the water when effecting the horizontal position. In this case 210 must be connected with 212. The current flows over 213 through the parallel terminal 214 and terminates in the generator 169.

The service currents continue to act until the axis position has attained the desired or the permissible amplitude or the actual position. It is obvious that the camera release is only effected in this position of the circuit for the instantaneous shutters, as shown in Fig. 31.

The last deviations from the vertical position which may be observed in the adjusting telescope can be removed by the simultaneously acting manual devices. Any final deviations which may occur are shown accurately by the photographs of the two recording cameras 64 whose instantaneous shutters are connected in the circuit 182—189 of the two camera shutters, so that the mathematical data for any final deviations from the normal case are accurately known and can be taken into consideration when comparing the map, in the appertaining protracting apparatus which is independent of the optical axes in space.

An aneroid 215 (Figs. 27, 28) can be connected in the circuit, whose circular scale 216 carries a movable vernier 217 which shows the permissible average alteration in the balloon height by its length, so that the hand 218, on attaining the previously adjusted height mark closes the circuit and releases the shutters.

The two cameras can consequently be released after each other in order to make overlapping balloon photographs with longer base and at similar balloon heights when travelling horizontally.

The foregoing devices, especially the connection between the electrical adjusting mechanism and the manual, is of such construction that the electric current causes the verticality of the two camera axes at least with close approximation to the actual mathematical position. By the manually actuated devices, the deviations observed through the optical sighting devices are removed.

Cinematographic machines may be substituted for the cameras herein described for stereoscopic cinematography.

Having now described my invention what I claim as new and desire to secure by Letters Patent is:—

1. In an apparatus for the production of aero-geodetical photographs, the combination with an air vehicle, of a pair of biaxially arranged cameras spaced a known distance apart; a tensioned flexible member suspending said cameras from the vehicle; and positive parallel guiding devices connecting said cameras.

2. In an apparatus for the production of aero-geodetical photographs, the combination with an air vehicle; of a high tensioned flexible member suspended from said vehicle; a pair of cameras suspended from said member and each comprising a plurality of long focus cameras having their objectives lying in a common spherical surface; auxiliary instruments associated with the camera; and means for photographically recording the axial position and the position of the auxiliary instruments.

3. In an apparatus for the production of aero-geodetical photographs, the combination with an air vehicle; of a high tensioned flexible member suspended from said vehicle; a pair of cameras suspended from said member and each comprising a plurality of long focus cameras having their objectives lying in a common spherical surface and their axes meeting at the same point at equal angles; auxiliary instruments associated with the camera; and means for photographically recording the axial position and the position of the auxiliary instruments.

4. In an apparatus for the production of aero-geodetical photographs, the combination with an air vehicle; of a high tensioned flexible member suspended from said vehicle; a pair of cameras suspended from said member and each comprising a plurality of long focus cameras having their objectives lying in a common spherical surface; auxiliary instruments associated with the camera; means for photographically recording the axial position of the auxiliary instruments; and positive parallel guiding devices interconnecting the cameras.

5. In an apparatus for the production of aero-geodetical photographs, the combination with an air vehicle; of a pair of biaxially arranged cameras each comprising a plurality of downwardly pointing cameras, the center camera pointing vertically downwardly and others pointing at a divergent angle at each side of the center camera, the axes of the center and associated side cameras lying in the same plane.

6. A process of taking aero-geodetical photographs, consisting in simultaneously steroscopically photographing a central area and adjoining lateral areas; and repeating the process with the axis of the central area being the same but the exposure being at a different angle of rotation about said axis and repeating the process until all of the area adjacent to the central area is photographed.

7. A process of taking aero-geodetical photographs, consisting in simultaneously steroscopically photographing a central area and adjoining lateral areas; repeating the process with the axis of the central area being the same but the exposure being at a different angle of rotation about said axis and repeating the process until all of the area adjacent to the central area is photographed.

8. In an apparatus for the production of aero-geodetical photographs, the combination with an air vehicle; of a pair of bi-axially arranged cameras; a Cardan suspension for each camera, each comprising an outer fixed member, an outer oscillating member within the fixed member and an inner oscillating member within the outer oscillating member; co-operating electro-magnets on each member and the respective surrounding members; a U-tube having mercury therein; contact members at the ends of said tube; and means connecting said contact members to said electromagnet so that when the mercury contacts the contact members oppositely disposed magnets are excited with opposite polarity.

9. In an apparatus for the production of aero-geodetical photographs, the combination with an air vehicle; of a pair of bi-axially arranged cameras; a Cardan suspension for each camera, each comprising an outer fixed member, outer oscillating member within the fixed member and an inner oscillating member within the outer oscillating member; co-operating electro-magnets on each member and the respective surrounding members; a U-tube having mercury therein; contact members at the ends of said tube; means connecting said contact members to said electromagnets so that when the mercury contacts the contact member oppositely disposed magnets are excited with opposite polarity; means for mechanically inter-engaging the iron cores of said magnets during the passage of current and disengaging them when the current ceases.

10. In an apparatus for the production of aero-geodetical photographs, the combination with an air vehicle; of a pair of bi-axially arranged cameras; Cardan suspensions supporting the respective cameras on the vehicle and each comprising a base for the adjustment of the camera; shutters on the cameras; communicating tubes located on the cameras and said bases and having mercury therein; adjustable contact pins arranged in said tubes; and electrical circuit means connected with the contact pins and shutters forming a circuit and thereby opening the shutters, when the camera axes have attained the vertical position and the vehicle has attained the horizontal position within the desired limits.

11. In an apparatus for the production of aero-geodetical photographs, the combination with an air vehicle; of a pair of bi-axially arranged cameras; Cardan suspensions supporting the respective cameras on the vehicle and each comprising a central member and a base for the adjustment of the camera; shutters on the cameras; communicating tubes located on the cameras and said bases and having mercury therein; adjustable contact pins arranged in said tubes; and electrical circuit means connected with the contact pins, said central member and shutters forming a circuit and thereby opening the shutters, and braking or adjusting the central member when the camera axes have attained the vertical position and the vehicle has attained the horizontal position within the desired limits.

12. In an apparatus for the production of aero-geodetical photographs, the combination with an air vehicle; of a pair of bi-axially arranged cameras; Cardan suspensions supporting the respective cameras on the vehicle and each comprising a central member and a base for the adjustment of the camera; shutters on the cameras; communicating tubes located on the cameras and said bases and having mercury therein; adjustable contact pins arranged in said tubes; electrical circuit means connected with the contact pins, said central member and shutters forming a circuit and thereby opening the shutters, and braking or adjusting the central member when the camera axes have attained the vertical position and the vehicle has attained the horizontal position within the desired limits; and a lamp included in said circuit means and adapted to be lighted thereby when the required position of the cameras and air vehicle is arranged.

13. In an apparatus for the production of aero-geodetical photographs, the combination with an air vehicle; of a pair of bi-axially arranged cameras; Cardan suspensions supporting the respective cameras on the vehicle and each comprising a central member and a base for the adjustment of the camera; shutters on the cameras; communicating tubes located on the cameras and said bases and having mercury therein; adjustable contact pins arranged in said tubes; electrical circuit means connected with the contact pins, said central member and shutters forming a circuit and thereby opening the shutters, and braking or adjusting the central member when the camera axes have attained the vertical position and the vehicle has attained the horizontal position within the desired limits; and a rotary pump for pumping water to the ends of the vehicle for trimming purposes.

14. In an apparatus for the production of aero-geodetical photographs, the combination with an air vehicle; of a pair of bi-axially arranged cameras; Cardan suspensions supporting the respective cameras on the vehicle and each comprising a central member and a base for the adjustment of the camera; shutters on the cameras; communicating tubes located on the cameras and said bases and having mercury therein; adjustable contact pins arranged in said tubes; electrical circuit means connected with the contact pins, said central member and shutters forming a circuit and thereby opening the shutters, and braking or adjusting the central member when the camera axes have attained the vertical position and the vehicle has attained the horizontal position within the desired limits; balloonettes at opposite ends of the vehicle; and a fan for conveying air from one balloonette to the other for damping oscillations.

15. In an apparatus for the production of aero-geodetical photographs, the combination with an air vehicle; of a pair of bi-axially arranged cameras; Cardan suspensions supporting the respective cameras on the vehicle and each comprising a central member and a base for the adjustment of the camera; shutters on the cameras; communicating tubes located on the cameras and said bases and having mercury therein; adjustable contact pins arranged in said tubes; electrical circuit means connected with the contact pins, said central member and shutters forming a circuit and thereby opening the shutters, and braking or adjusting the central member when the camera axes have attained the vertical position and the vehicle has attained the horizontal position within the desired limits; and an aneriod having a vernier thereon included in said circuit whereby said aneroid closes the circuit when a predetermined altitude is reached.

16. In an apparatus for the production of aero-geodetical photographs, the combination with an air vehicle; of a pair of bi-axially arranged cameras; Cardan suspensions supporting the cameras beneath the vehicle; weight supports extending radially from said cameras; weights on the supports; and automatic electric means for shifting the weights in one direction when the cameras are tilted in the other direction.

17. In an apparatus for the production of aero-geodetical photographs, the combination with an air vehicle; of a pair of bi-axially arranged cameras; Cardan suspensions supporting the cameras beneath the vehicle; screw rods extending radially from the cameras; weights having threaded engagement with the rods and held against rotation; electric motors for rotating said rods; and electric means associated with the motors and camera for causing said motors to rotate the rods to shift the weights in one direction when the cameras are tilted in the other direction.

In testimony whereof, I have signed my name to this specification.

MAX GASSER.